(12) United States Patent
Bailey

(10) Patent No.: US 6,364,369 B2
(45) Date of Patent: Apr. 2, 2002

(54) TUBE CONNECTING DEVICE

(75) Inventor: David Bailey, Burnley (GB)

(73) Assignee: Fort Vale Engineering Limited (GB)

( * ) Notice: Subject to any disclaimer, the term of this patent is extended or adjusted under 35 U.S.C. 154(b) by 0 days.

(21) Appl. No.: 09/827,650

(22) Filed: Apr. 6, 2001

(30) Foreign Application Priority Data

Apr. 6, 2000 (GB) .............................................. 0008388

(51) Int. Cl.⁷ ................................................. F16L 37/18
(52) U.S. Cl. .......................... 285/312; 285/84; 285/85; 285/87; 285/88; 285/320
(58) Field of Search ................................ 285/312, 320, 285/84, 85, 87, 88

(56) References Cited

U.S. PATENT DOCUMENTS

| | | | | |
|---|---|---|---|---|
| 2,277,399 A | * | 3/1942 | Groff ........................... | 403/316 |
| 3,439,942 A | * | 4/1969 | Moore et al. ................. | 285/80 |
| 4,691,942 A | * | 9/1987 | Ford ........................... | 285/84 |
| 5,295,717 A | * | 3/1994 | Chen ........................... | 285/84 |
| 5,435,604 A | * | 7/1995 | Chen ........................... | 285/84 |
| 5,722,697 A | * | 3/1998 | Chen ........................... | 285/91 |
| 5,911,445 A | * | 6/1999 | Lee .............................. | 285/84 |
| 6,015,168 A | * | 1/2000 | Fahl ............................. | 285/81 |
| 6,047,995 A | * | 4/2000 | Kotake ........................ | 285/85 |
| 6,089,619 A | * | 7/2000 | Goda ........................... | 285/312 |
| 6,120,065 A | * | 9/2000 | Chen ........................... | 285/85 |
| 6,206,432 B1 | * | 3/2001 | Kamiyama ................... | 285/81 |
| 6,224,113 B1 | * | 5/2001 | Chien .......................... | 285/85 |

FOREIGN PATENT DOCUMENTS

| | | | | |
|---|---|---|---|---|
| DE | 584591 A2 | * | 2/1994 | ................. 285/320 |
| GB | 484768 A | * | 8/1937 | ................. 285/320 |

* cited by examiner

*Primary Examiner*—B. Dayoan
*Assistant Examiner*—Carlos Lugo
(74) *Attorney, Agent, or Firm*—Brooks & Kushman P.C.

(57) ABSTRACT

A tube connecting device comprises a housing, a socket formed in the housing for receipt of a pipe to be releasably secured therein and a securing arm pivotally mounted to the housing. The securing arm is pivotable from a first, locked position in which a portion of the arm projects through an associated aperture in the wall of the socket to engage a complementarily-shaped portion of the pipe to be retained, to a second unlocked position in which the projecting portion of the securing arm is withdrawn from the socket. The device further comprises an actuator mounted on the arm and a locking member located in a chamber within the arm.

24 Claims, 4 Drawing Sheets

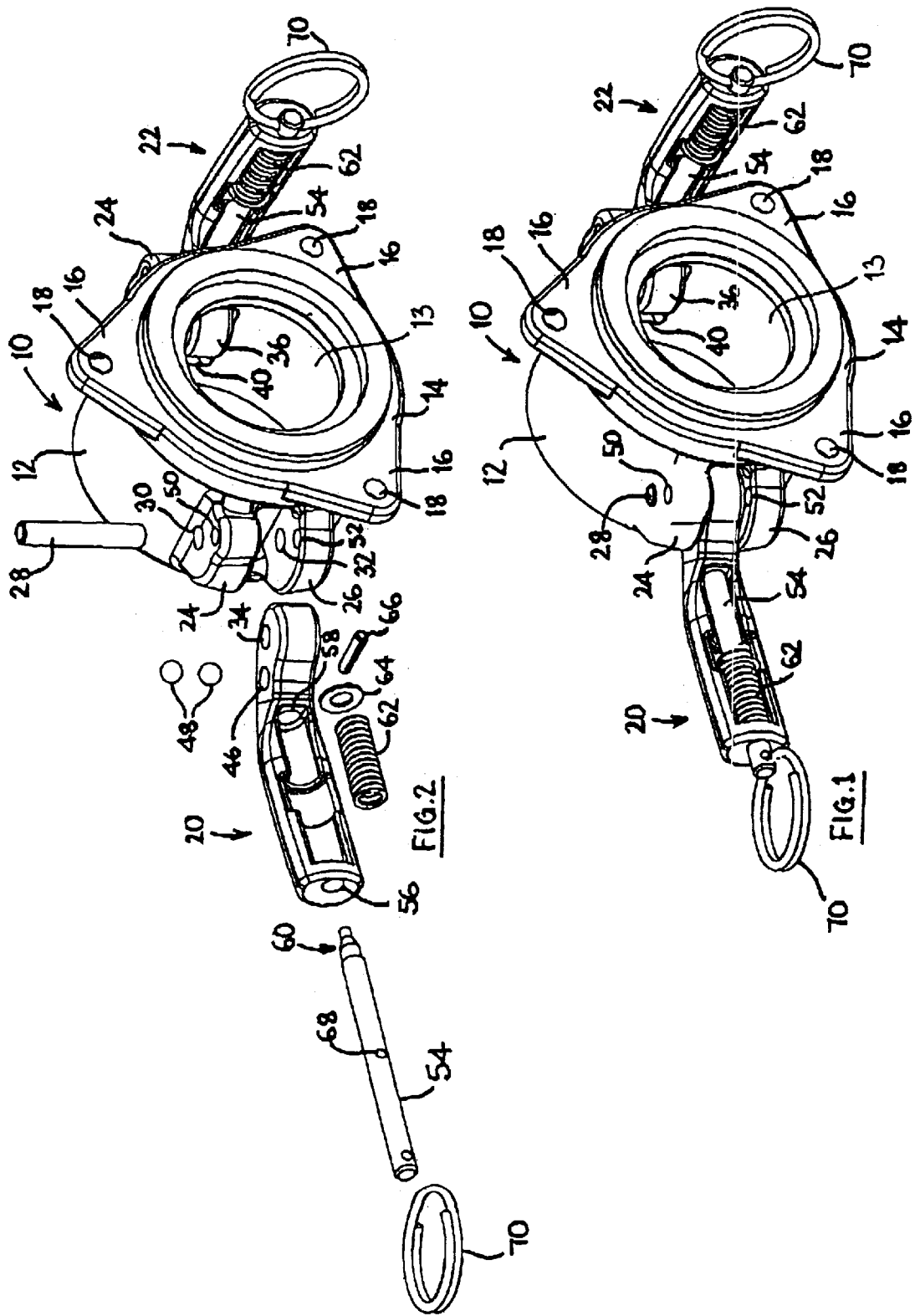

TUBE CONNECTING DEVICE

BACKGROUND OF THE INVENTION

1. Field of the Invention

The present invention relates to tube connecting devices and in particular to such devices for releasably connecting together the ends of two tubes.

2. Background Art

A conventional tube connecting device comprises a generally tubular housing which, in use, is connected to one end of a pipe. The housing forms a tubular socket for receipt of an end of another pipe. The pipe received within the socket is releasably held therein by means of two pivotally mounted retaining arms, mounted diametrically opposite each other on the outer surface of the housing. The securing arms are pivotable through approximately a right angle from a securing position in which a projection on the arms extends through an aperture in the wall of the cylindrical socket and engages with a peripheral recess in the outer surface of the pipe to be retained, to an unsecured position in which the projection is withdrawn from the aperture and from the peripheral recess on the pipe, thereby allowing the pipe to be removed.

Various techniques are known for releasably securing the retaining arms in the locked position in order to prevent inadvertent disengagement of the pipe. In one arrangement each of the retaining arms is provided with a slot through which an apertured lug located on the exterior of the housing projects when the arm is in its locked position, in the manner of a hasp and staple connector. The arms can be held in position by passing a fastening ring, secured to the ends of the securing arms, through the staple. However, this arrangement is not particularly convenient to use and thus there is a risk that operators might be discouraged from securing the securing arms in the locked position.

An alternative arrangement referred to in U.S. Pat. No. 5,295,717 utilizes a spring-loaded positioning rod on each of the securing arms which, when the arms are in their locked position, engage with an associated blind bore in the housing of the device. The housing is also provided with an inclined flange with which the retaining rod engages as the securing arm is pivoted to its locked position, which causes the positioning rod to be displaced against the restoring force of the spring as the securing arm is pivoted, until the securing arm reaches its locked position, whereupon the positioning rod snaps into its associated recess. In order to pivot the securing arms to the open position the positioning rods are withdrawn out of their associated recesses against the force of the restoring springs, thereby allowing the securing arms to be pivoted. However, whilst this arrangement is an improvement over the first-mentioned arrangement, considerable physical effort can be involved in pivoting the securing arms to their closed position since the positioning rod must be displaced against the force of its associated restoring spring by means of a camming action against the inclined surface of the flange which itself introduces a considerable amount of friction.

SUMMARY OF THE INVENTION

In accordance with the first aspect of the present invention, a tube connecting device comprises a housing, a socket formed in the housing for receipt of a pipe or tube to be releasably secured therein, and a securing arm pivotally mounted to the housing and being pivotable from a first, locked position in which a portion of the arm projects through an associated aperture in the wall of the socket to engage a complementarily-shaped portion of the pipe to be retained, to a second, unlocked position in which the projecting portion of the securing arms is withdrawn from the socket, the device further comprising an actuator mounted on the arm and a locking member located in a chamber within the arm, the actuator being displaceable from a first, locking position in which it displaces the locking member partially out of the chamber and engages it with a recess in the housing to releasably retain the arm in the locked position, to an unlocking position in which the locking member is movable out of the recess, whereby the securing arm can be pivoted away from the locked position.

Preferably, the actuator projects into the chamber in which the locking member is located when in the first, locking position.

In one embodiment, there is a plurality of locking members.

The or each locking member may comprise a ball.

In another embodiment, the chamber is elongate and is dimensioned to allow movement of the or each locking member only along the chamber except during engagement with or disengagement from a recess in the housing. There may be a plurality of locking members in the chamber. The locking members in the chamber are preferably substantially identical.

In a further embodiment, the actuator engages two locking members. The actuator may be arranged to displace the two locking members in opposite directions into engagement with respective recesses in the housing.

The total length of the or each locking member in the direction of the chamber preferably does not exceed the length of the chamber.

Preferably, when the securing arm is pivoted away from its locked position, the or each locking member is located completely within the chamber.

The device may further comprise means for preventing the or each locking member from leaving the chamber when the arm is pivoted away from its locked position. The device may comprise an abutment member which opposes an open end of the chamber when the arm is pivoted away from its locked position. Conveniently, the or each recess for receipt of a locking member may be located in the abutment member. The abutment member preferably forms part of the housing.

In yet another embodiment, a mounting lug for the arm in which the chamber is located extends across an open end of the chamber and forms the abutment member. The device preferably comprises two mounting lugs between which the arm is mounted, each mounting lug being located across an open end of the chamber and forming an abutment member.

In a still further embodiment, the recess in the housing for engaging the locking member comprises a bore. The bore is preferably narrower than the locking member with which it is engageable.

The actuator comprises a retractable rod. The end of the rod is preferably tapered. The rod is preferably spring loaded towards its locking position. The device may further comprise a handle for withdrawing the actuator towards its unlocking position.

Preferably, the device comprises a plurality of said securing arms.

By way of example only, a specific embodiment of the present invention will now be described, with reference to the accompanying drawings.

BRIEF DESCRIPTION OF THE DRAWINGS

FIG. 1 is a perspective view of an embodiment of tube connecting device in accordance with the present invention;

FIG. 2 is a partly-exploded perspective view of the device of FIG. 1, in a partly-exploded view;

DETAILED DESCRIPTION OF THE PREFERRED EMBODIMENTS

Figure 3:
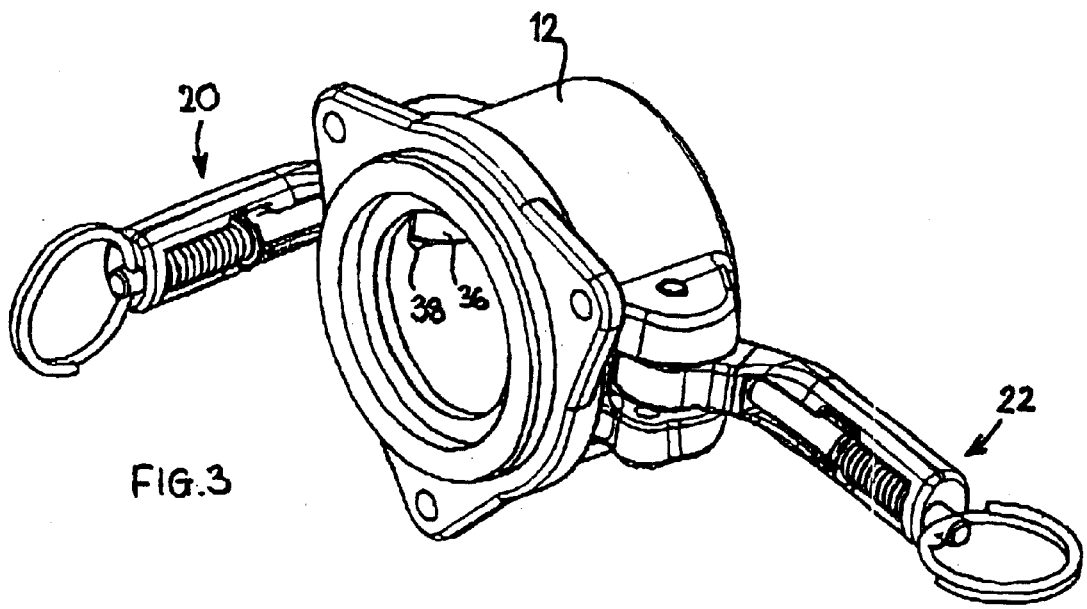
FIG. 3 is a different perspective view of the device of FIG. 1.
Figure 4:
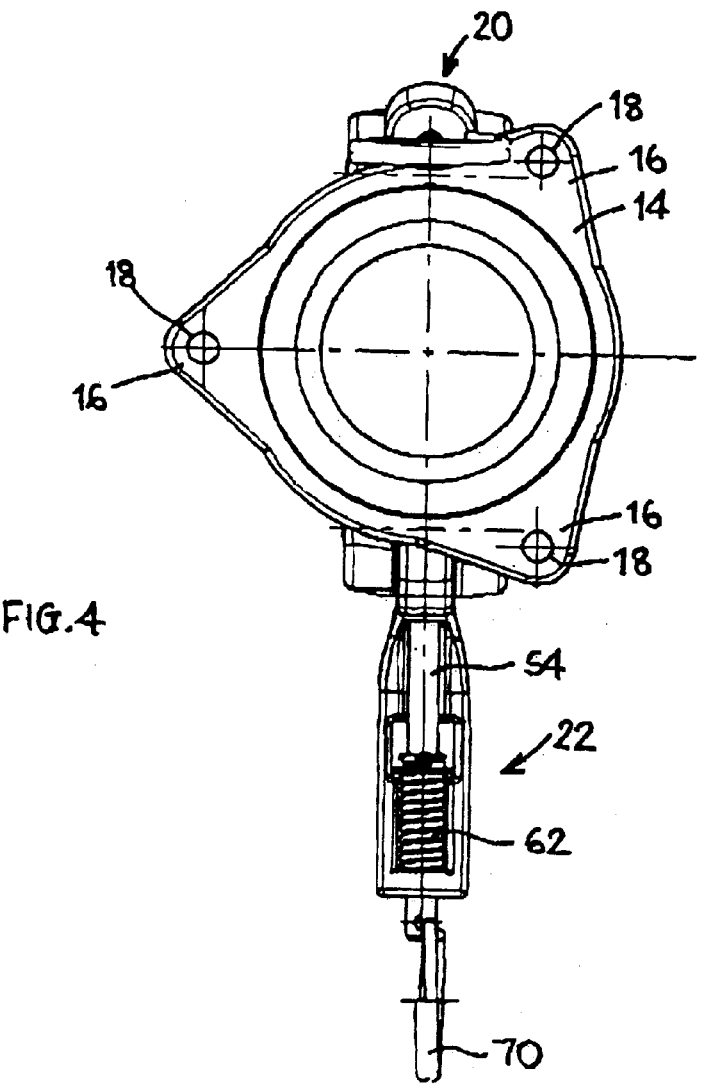
FIG. 4 is an end view of the device of FIG. 1.
Figure 5:
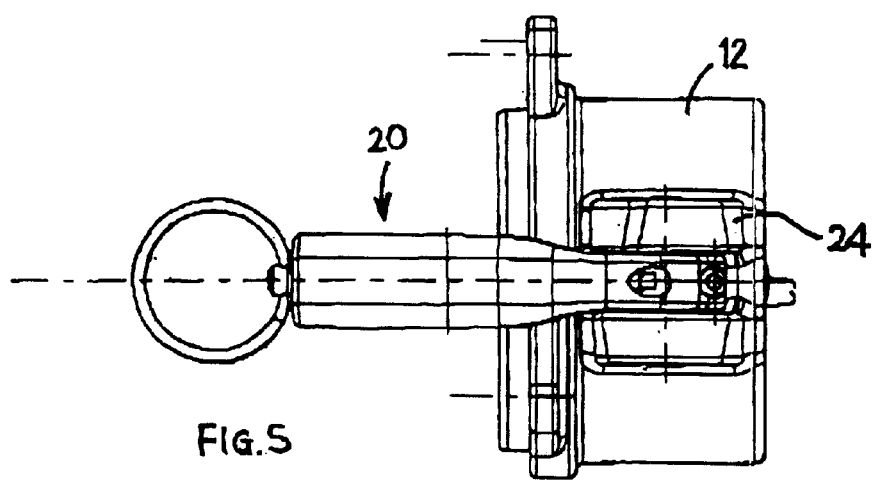
FIG. 5 is a view of the device of FIG. 1 looking in direction of arrow V in FIG. 1.
Figure 6:
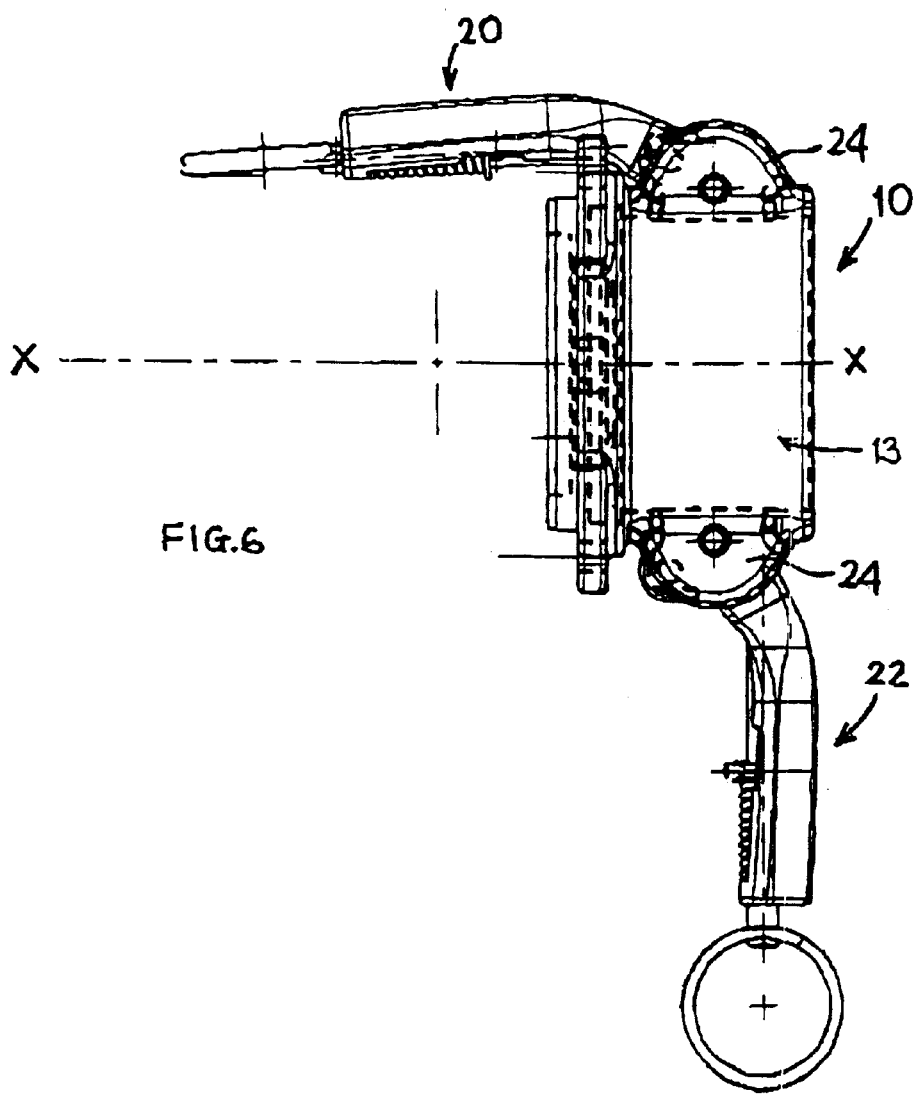
FIG. 6 is a plan view of the device shown in FIG. 1.
Figure 7:
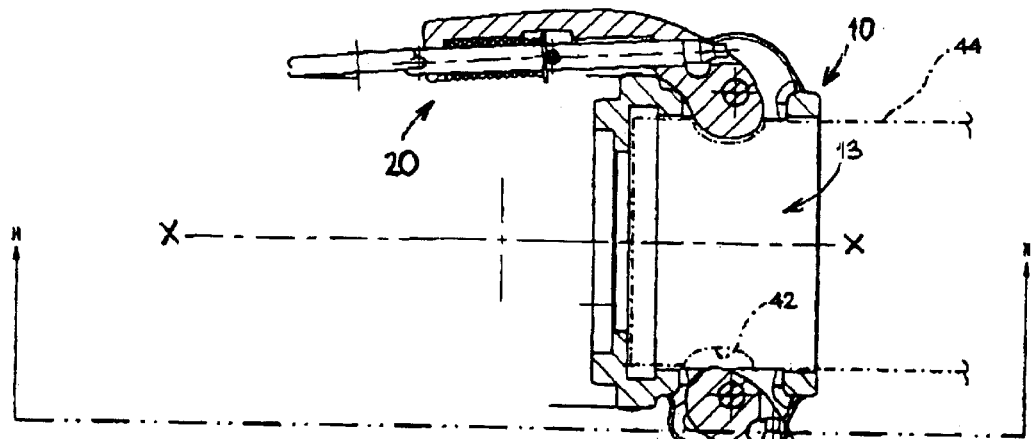
FIG. 7 is a cross-section through the device of FIG. 1, showing one arm in the locked position and another arm in the unlocked position.
Figure 8:
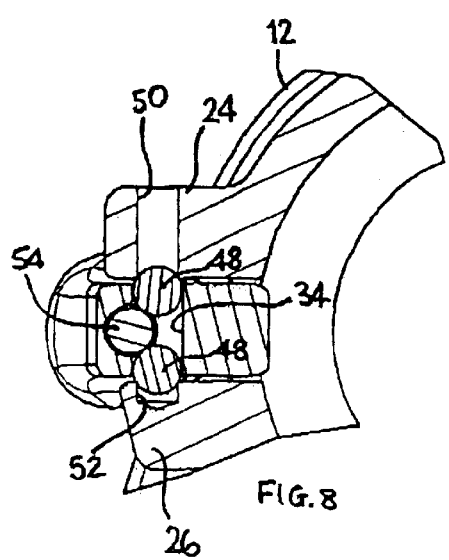
FIG. 8 is a detailed cross-sectional view looking in the direction of arrows VIII in FIG. 7.
Figure 9:
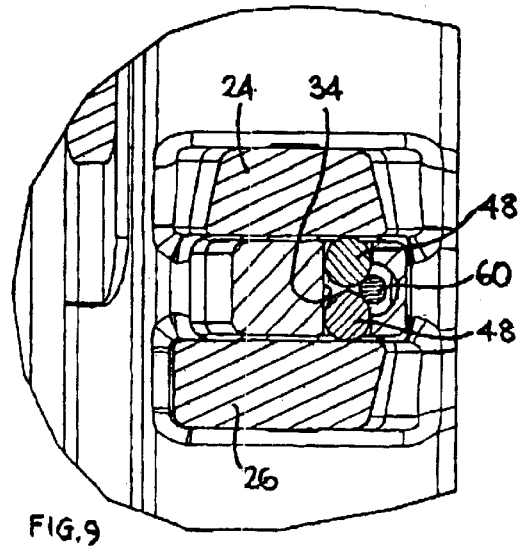
FIG. 9 is a detailed cross-sectional view looking in the direction of arrows IX in FIG. 7.

The tube connecting device comprises a stainless steel housing 10 having a generally tubular portion 12 forming a socket 13 with a longitudinal axis X (FIGS. 6 and 7). In this embodiment, the housing also has a connecting flange 14 at one end of the tubular portion 12, the connecting flange 14 having three lobes 16, each having a through aperture 18 for releasable connection to an end of a pipe or tube in a conventional manner, but a the connecting flange may be replaced by a different type of connector if desired.

Two identical securing arms 20, 22 are pivotally mounted at diametrically-opposed positions to the exterior of the tubular portion 12. The securing arms are each mounted between two mounting lugs 24, 26 which receive between them one end of a securing arm 20, 22. A pivot pin 28 passes through, and is secured in, aligned bores 30, 32, 34 in the two lugs 24, 26 and the end of each of the securing arms 20, 22 respectively.

Each of the securing arms 20, 22 is pivotable through approximately a right angle from an unlocked position (as shown by securing arm 20 in FIG. 2) in which it lies approximately perpendicular to the longitudinal axis X of the tubular portion 12, to a locked position (as shown by arm 22 in FIG. 2) in which it lies approximately parallel to the longitudinal axis X of the tubular portion 12. As shown in the figures, when the arms are in their locked position a projecting nose portion 36 adjacent to the aperture 34 which receives the pivot pin 28 projects through one of two diametrically-opposed apertures 38, 40 passing through the wall of the tubular portion. The projecting portions 36 are intended to engage with a peripheral recess 42 adjacent to one end of a pipe 44 to be secured in the device, as best seen in FIG. 7. When the securing arms are pivoted to their unlocked position each of the projecting portions 36 is withdrawn out of the socket portion to a location in between its two associated mounting lugs 24, 26.

As best seen in FIG. 2, the end of each of the securing arms adjacent to the mounting aperture 34 (hereinafter referred to as the proximal end of the securing arms) is provided with a further through aperture 46 which receives two stainless steel balls 48 which form releasable locking members. The combined diameter of the two balls 48 does not exceed the spacing of the inner faces of the mounting lugs 24, 26 and preferably does not exceed the length of the elongate chamber 46. In this embodiment the combined diameter of the balls 48 is equal to the length of the aperture 46 so that the balls can be fully withdrawn and completely housed within the chamber formed by the through aperture 46, whereby the balls do not hinder the pivoting movement of the securing arms 20, 22 when they are not in their locked position.

The mounting lugs 24, 26 are each provided with further aligned bore 50,52 which are also aligned with the bore 46 forming the chamber in the associated securing arm when the arm is in its locked position. The diameter of the bores 50, 52 is smaller than that of the balls 48, such that the balls 48 can project partially into the bores 50, 52 in the mounting lugs 24, 26 but cannot project fully into the bores.

Each of the securing arms 20, 22 is also provided with an elongate straight actuating rod 54 which passes through aligned apertures 56, 58 in opposite ends of the securing arm such that it is constrained to move along its longitudinal axis. One end of the rod 54 is provided with a tapered nose 60 which normally projects into the chamber formed by the bore 46. The rod 54 is urged towards this position by means of a compression spring 62 located around the opposite end of the rod, the spring acting on the rod by means of a washer 64 located around the rod and an engagement pin 66 which abuts the washer 64 and passes through a drilled bore 68 within the rod 54. The rod 54 is thereby urged in a direction towards the proximal end of the arm but can be withdrawn against the restoring force of the spring by means of a handle 70 in the form of a ring which passes through a drilled bore in the opposite end of the rod 54.

In use, the securing arms 20, 22 are pivoted to their open position, if necessary, by withdrawing the securing pins 54 and pivoting the arms through a right angle such that they project substantially perpendicularly to the longitudinal axis X of the tubular portion 12. The pivoting of the arms 20, 22 and the engagement of the balls 48 with the periphery of the respective bores 50, 52 in the lugs 24, 26 during such pivoting causes the balls to be displaced into their bores 46. When the arms 20, 22 are in their open, unlocked position, each bore 46 is located between the inner faces of the two opposed mounting lugs 24, 26, which prevents the balls from falling out of the bore 46. A pipe 44 to be secured is then located within the tubular socket portion, whereupon the securing arms 20, 22 are then pivoted to their closed position, thereby engaging the projecting portions 36 of the securing arms with the peripheral recess 42 in the end of the pipe 44.

As the securing arms are pivoted to their final closed positions, the bore 46 adjacent the proximal end of the securing arms is aligned with the two bores 50, 52 in the securing lugs 24, 26 respectively. This allows the spring 62 to displace the actuating rod 54 such that its tapered nose 60 projects into the chamber, thereby forcing the two balls outwardly such that they partially project into the aligned bores 50, 52 in the lugs 24, 26 respectively. Thus, the securing arm is locked in the closed position.

When it is desired to pivot the securing arm to its open position, the actuating pin 54 is withdrawn by pulling on the handle 68 against the restoring force of the spring 62. When the securing arm is then pivoted, the balls 48 are displaced back into the chamber formed by the bore 46, thereby allowing the securing arms to pivot.

The invention is not restricted to the details of the foregoing embodiment. For example, the materials from which the device is constructed may be different from those described. For example, one or more of the stainless steel components (e.g. the housing) may be formed from some other metal, such as aluminum. Moreover, although the specific embodiment described includes two securing arms 20, 22, there may be a single such securing arm or more than two (e.g. three or four) such securing arms.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tube connecting device comprising a housing, a socket formed in the housing for receipt of a pipe to be releasably secured therein, a securing arm pivotally mounted to the housing, the securing arm being pivotable from a first, locked position in which a portion of the arm projects through an associated aperture in the wall of the socket to engage a complementarily-shaped portion of the pipe to be retained, to a second, unlocked position in which a projecting portion of the securing arm is withdrawn from the socket, an actuator mounted on the arm, and a locking member located in a chamber within the arm, the actuator being displaceable from a first, locking position in which it displaces the locking member partially out of the chamber and engages it with a recess in the housing to releasably retain the arm in the locked position, to an unlocking position in which the locking member is movable out of the recess in the housing, whereby the securing arm can be pivoted away from the locked position.

2. A tube connecting device as claimed in claim 1, wherein the actuator projects into the chamber in which the locking member is located when in the first, locking position.

3. A tube connecting device as claimed in claim 1, further comprising a plurality of locking members.

4. A tube connecting device as claimed in claim 2, wherein the locking member comprises a ball.

5. A tube connecting device as claimed in claim 1, wherein the chamber is elongate and is dimensioned to allow movement of the locking member only along the chamber except during engagement with or disengagement from a recess in the housing.

6. A tube connecting device as claimed in claim 4, further comprising a plurality of locking members in the chamber.

7. A tube connecting device as claimed in claim 6, wherein the locking members in the chamber are substantially identical.

8. A tube connecting device as claimed in claim 6, wherein the actuator engages two locking members.

9. A tube connecting device as claimed in claim 8, wherein the actuator displaces the two locking members in opposite directions into engagement with respective recesses in the housing.

10. A tube connecting device as claimed in claim 1, wherein the total length of the locking member in the direction of the chamber does not exceed the length of the chamber.

11. A tube connecting device as claimed in claim 10, wherein when the securing arm is pivoted away from its locked position, the locking member is located completely within the chamber.

12. A tube connecting device as claimed in claim 1, further comprising means for preventing the locking member from leaving the chamber when the arm is pivoted away from its locked position.

13. A tube connecting device as claimed in claim 12, further comprising an abutment member which opposes an open end of the chamber when the arm is pivoted away from its locked position.

14. A tube connecting device as claimed in claim 13, wherein the recess for receipt of a locking member is located in the abutment member.

15. A tube connecting device as claimed in claim 14, wherein the abutment member forms part of the housing.

16. A tube connecting device as claimed in claim 13, wherein a mounting lug for the arm in which the chamber is located extends across an open end of the chamber and forms the abutment member.

17. A tube connecting device as claimed in claim 16, further comprising two mounting lugs between which the arm is mounted, each mounting lug being located across an open end of the chamber and forming an abutment member.

18. A tube connecting device as claimed in claim 1, wherein the recess in the housing for engaging the locking member comprises a bore.

19. A tube connecting device as claimed in claim 18, wherein the bore is narrower than the locking member with which it is engageable.

20. A tube connecting device as claimed in claim 1, wherein the actuator comprises a retractable rod.

21. A tube connecting device as claimed in claim 20, wherein the end of the rod is tapered.

22. A tube connecting device as claimed in claim 20, wherein the rod is spring loaded towards its locking position.

23. A tube connecting device as claimed in claim 1, further comprising a handle for withdrawing the actuator towards its unlocking position.

24. A tube connecting device as claimed in claim 1, further comprising a plurality of said securing arms.

\* \* \* \* \*